United States Patent
Shiga et al.

(10) Patent No.: US 8,014,044 B2
(45) Date of Patent: Sep. 6, 2011

(54) IMAGE SCANNING DEVICE

(75) Inventors: Yuki Shiga, Hyogo (JP); Hiroyuki Deguchi, Hyogo (JP)

(73) Assignee: Kyocera Mita Corporation (JP)

( * ) Notice: Subject to any disclaimer, the term of this patent is extended or adjusted under 35 U.S.C. 154(b) by 400 days.

(21) Appl. No.: 12/184,803

(22) Filed: Aug. 1, 2008

(65) Prior Publication Data

US 2009/0051983 A1  Feb. 26, 2009

(30) Foreign Application Priority Data

Aug. 22, 2007  (JP) .................... 2007-215789

(51) Int. Cl.
   *H04N 1/04*  (2006.01)
(52) U.S. Cl. ........ 358/488; 358/474; 358/486; 358/497; 358/464; 358/465; 358/449
(58) Field of Classification Search .............. 358/488, 358/486, 497, 494, 474, 464, 465, 466, 449; 382/286, 312; 250/234–236; 399/211, 212
See application file for complete search history.

(56) References Cited

U.S. PATENT DOCUMENTS

| 5,126,792 A * | 6/1992 | Iwata .................. 399/169 |
| 2009/0067758 A1* | 3/2009 | Iwaki et al. .......... 382/321 |
| 2010/0020366 A1* | 1/2010 | Iwaki .................. 358/474 |

FOREIGN PATENT DOCUMENTS

JP  H07-003554 B2  1/1995
JP  2005278200 A  * 10/2005

* cited by examiner

*Primary Examiner* — Cheukfan Lee
(74) *Attorney, Agent, or Firm* — Ostrolenk Faber LLP

(57) ABSTRACT

An image scanning device of the present invention includes a platen, an image scanning part that scans an image on the manuscript, a light source that irradiates light from the back side of the platen, a platen cover that is allowed to be positioned in a closed state or in an opened state, a light receiving part that is configured to receive light from the manuscript scanning area on the back side of the platen, a range obtaining part that is configured to obtain range between the amount of received light of the light receiving part in the opened state of the platen cover and the amount of received light of the light receiving part in the closed state of the platen cover, and a manuscript detecting part that is configured to detect existence of the manuscript in a manuscript scanning area of the platen based on the range.

10 Claims, 14 Drawing Sheets

IMAGE SCANNING DEVICE

CROSS-REFERENCE TO RELATED APPLICATIONS

This application claims priority to Japanese Patent Application No. 2007-215789 filed on Aug. 22, 2007, the entirety of which is hereby incorporated by reference.

BACKGROUND OF THE INVENTION

1. Field of the Invention

The present invention relates to an image scanning device that is configured to scan an image from a manuscript.

2. Background Information

Some image forming devices (e.g., photocopier) and image scanning devices (e.g., scanner) are provided with a function of automatically detecting the manuscript size and automatically selecting the size of the image data to be outputted and the transfer medium (e.g., paper) so that the image data and the transfer media are fitted to the detected manuscript size.

A technology for detecting a manuscript on a glass platen by way of a light sensor has been known as an example of detection technology for the manuscript size. In addition, a technology for detecting the manuscript size by the combination of the output signals of a light sensor when a platen cover is opened and closed has been proposed.

As an example of the above described technology, Japanese Examined Patent Publication No. H07-3554 discloses a photocopier that includes a manuscript size detector, a platen glass, a platen cover that is openably/closeably disposed to cover the platen glass, an optical system for scanning a manuscript on the platen glass, and four manuscript size detectors. Each of the manuscript size detectors is made up of a light-emitting element for irradiating light to the platen glass from the bottom of the platen glass, a lens for forming an image on the upper surface of the platen glass with the light irradiated by the light-emitting element, a light-receiving element for detecting light reflected by the manuscript on the platen glass, and a lens for forming an image on the light-receiving surface of the light-receiving element with the reflected light. The manuscript size detectors are disposed so that their focal positions on the platen glass are different from each other. In the photocopier, the manuscript size is distinguished by the combination of output signals produced by the manuscript size detectors.

In the photocopier, the light irradiated by the light-emitting element is reflected by the manuscript in the area on the platen glass where the manuscript exists. Therefore, light enters the light-receiving element regardless whether the platen cover is opened or closed, and accordingly the signal output from the manuscript size detector will be in an on state. Also, as to a black part on the manuscript, the amount of reflected light is small regardless of whether the platen cover is opened or closed. Therefore, the signal output will be in an off state. On the other hand, while the platen cover is opened, the light irradiated by the light-emitting element is neither reflected by the manuscript nor the platen cover in the area on the platen glass where the manuscript does not exist. Therefore, the amount of light received by the light-receiving element is small, and accordingly the signal output from the manuscript size detector will be in the off state. However, light is reflected by the platen cover while the platen cover is closed. Therefore, the amount of light received by the light-receiving element is increased, and accordingly the signal output of the manuscript size detector will be in the on state.

As described above, according to the photocopier described in the above patent reference, it has been determined that a manuscript does not exist in a position where the signal output is switched between an on state and an off state by opening and closing the platen cover, and it also has been determined that a manuscript exists in a position where the signal output is not changed by opening and closing the platen cover. Based on the judgments, the manuscript size will be determined.

In view of the above, it will be apparent to those skilled in the art from this disclosure that there exists a need for an improved image scanning device. This invention addresses this need in the art as well as other needs, which will become apparent to those skilled in the art from this disclosure.

SUMMARY OF THE INVENTION

A conventional manuscript size detector often erroneously detects the manuscript size, and therefore it is needed to be improved.

An image scanning device of the present invention includes a platen, an image scanning part, a light source, a platen cover, a light receiving part, a range obtaining part, and a manuscript detecting part. The platen has a manuscript scanning area and is allowed to have a manuscript disposed on the front side thereof. The image scanning part is configured to scan an image on the manuscript disposed on the manuscript scanning area from the back side of the platen. The light source is configured to irradiate light to the manuscript scanning area from the back side of the platen. The platen cover is allowed to be positioned in a closed state to prevent light from entering the manuscript scanning area from the front side of the platen or an opened state to allow light to enter the manuscript scanning area from the front side of the platen. The light receiving part is configured to receive light from the manuscript scanning area on the back side of the platen. The range obtaining part is configured to obtain a range between the amount of received light of the light receiving part in the opened state of the platen cover and the amount of received light of the light receiving part in the closed state of the platen cover. The manuscript detecting part is configured to detect existence of a manuscript in the manuscript scanning area based on the range.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

An embodiment of the present invention will be hereinafter explained with reference to the attached figures. In the embodiment, the present invention is applied to a scanner. However, the embodiment is an example of the present invention, and the technical scope of the present invention is not limited thereby.

1. Schematic Configuration of Image Scanning Device 100

A schematic configuration of an image scanning device 100 of the present embodiment will be hereinafter explained with reference to FIGS. 1 to 3.

Figure 1:
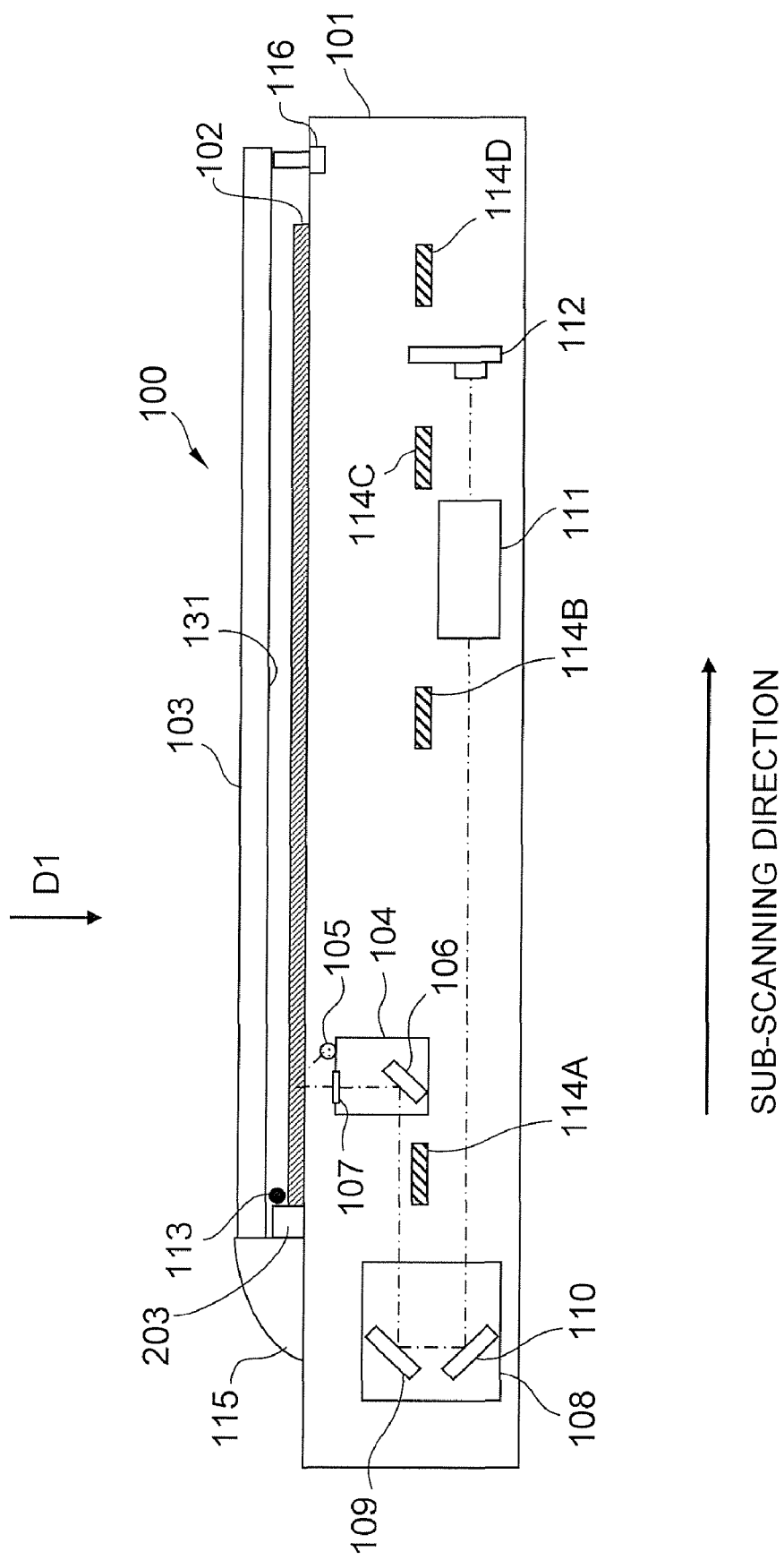
FIG. 1 is a side cross-sectional view of illustrating a schematic configuration of the interior of an image scanning device in accordance with a preferred embodiment of the present invention.

FIG. 1 is a lateral cross-sectional view illustrating a schematic configuration of the interior of the image scanning device 100. FIG. 2 is a top plan view of the image scanning device 100 seen from a direction D1 in FIG. 1. FIG. 3 is a view of a block diagram illustrating main elements making up the image scanning device 100. In FIG. 1, the sub-scanning direction of the image scanning device 100 is a horizontal direction. On the other hand, in FIG. 2, the main-scanning direction of the image scanning device is a vertical direction, and the sub-scanning direction thereof is a horizontal direction. The directions are illustrated with arrows in FIGS. 1 and 2. Note that illustration of a cover 103 is omitted in FIG. 2.

Figure 2:
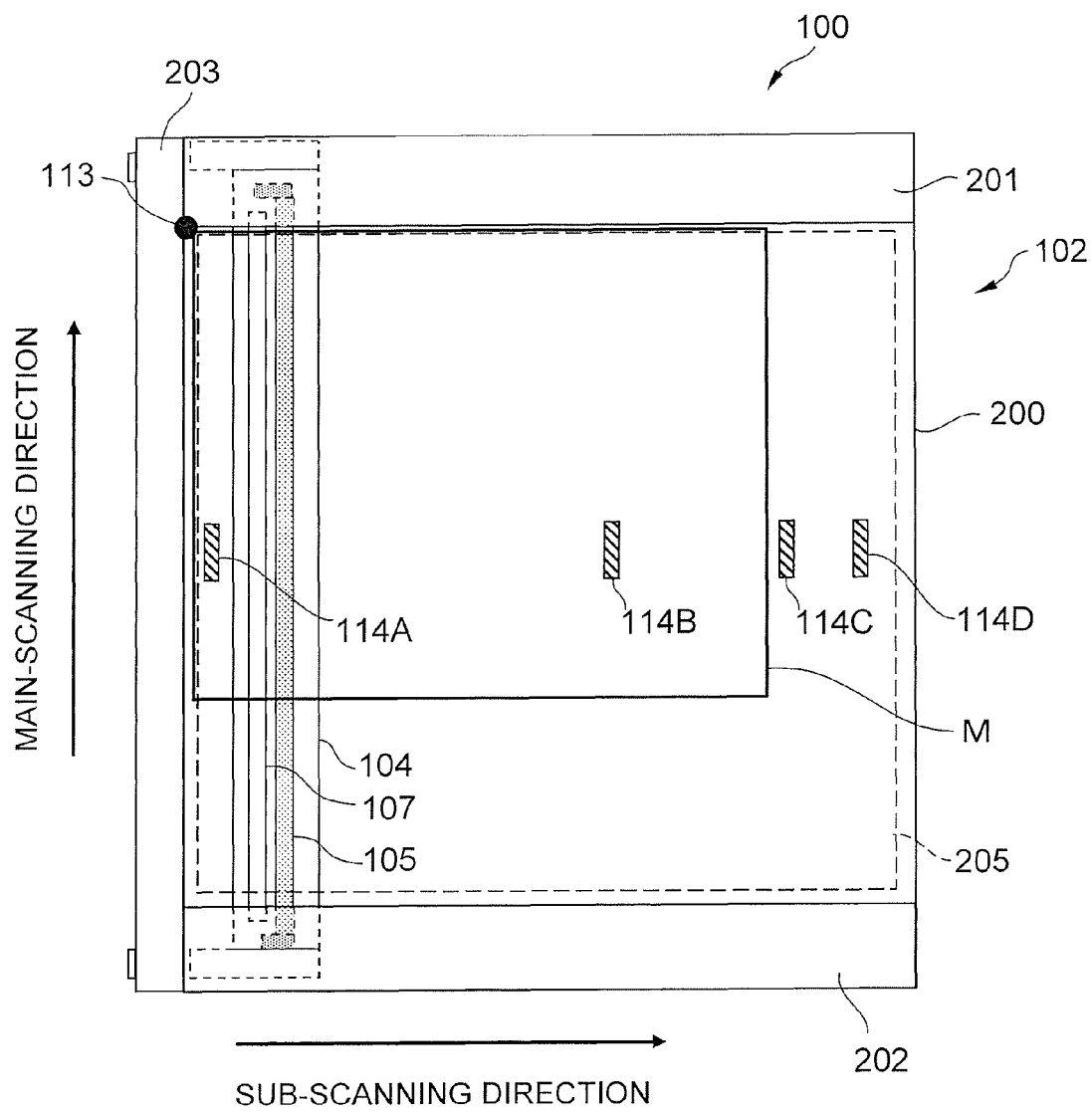
FIG. 2 is a top plan cross-sectional view of the image scanning device seen from a direction D1 in FIG. 1.

As illustrated in FIGS. 1 and 2, the image scanning device 100 is provided with a main body 101, a platen 102, the cover 103, a first carriage 104, a second carriage 108, a group of lenses 111, a CCD (charged-coupled device) 112, reflection sensors 114 (114A to 114D), an open/close detecting part 116, and the like.

As illustrated in FIGS. 1 and 2, the platen 102 is disposed on the upper surface of the main body 101, and includes a rectangular scanning area 205. Specifically, the platen 102 includes a contact glass 200 and first to third regulation members 201 to 203. The contact glass 200 is a rectangular transparent glass plate. The first to third regulation members (201 to 203) are rectangular opaque plate members.

As illustrated in FIG. 2, the first regulation member 201 and the second regulation member 202 are respectively disposed to cover both ends of the contact glass 200 in the main-scanning direction. In other words, two sides of the contact glass 200, which are parallel to the sub-scanning direction, are covered with the first regulation member 201 and the second regulation member 202. In addition, the third regulation member 203 is disposed to cover an end of the contact glass 200 in the sub-scanning direction, which is disposed close to a hinge 115 (to be described). In other words, one of two sides, which are parallel to the main-scanning direction, of the contact glass 200 is covered with the third regulation member 203.

The scanning area 205 is an area on the contact glass 200, which is illustrated with a dotted line in FIG. 2. Here, none of the first to third regulation members (201 to 203) is disposed on the scanning area 205. On the other hand, an area on the contact glass 200, on which any of the first to third regulation members (201 to 203) is disposed, is set to be a non-scanning area. In other words, the regulation members are arranged on the non-scanning area. The scanning area 205 is a target area for scanning a manuscript, and the non-scanning area is not a target area for scanning a manuscript.

The upper surface of the first regulation member 201 and that of the third regulation member 203 protrude upward above the upper surface of the contact glass 200 because the first regulation member 201 and the third regulation member 203 are arranged on the contact glass 200. One of four corners of the scanning area 205, which is defined by an intersection of the first regulation member 201 and the third regulation member 203, is hereinafter referred to as a reference point 113.

A manuscript M is disposed on the upper surface of the platen 102 so that the front surface (the surface on which an image is put) of the manuscript M is opposed to the upper surface of the platen 102. Here, a user is capable of aligning a corner of the manuscript M to the reference point 113 by disposing the manuscript M on the contact glass 200 so that it is disposed along the brims of the first regulation member 201 and the third regulation member 203.

The cover 103 is mounted on the upper surface of the main body 101 through the hinge 115. The cover 103 is configured to be allowed to be opened and closed with respect to the platen 102 when it is rotated around the hinge 115. The cover 103 is formed in a shape with which the scanning area 205 is covered. Therefore, while the cover 103 is closed, light does not enter the scanning area 205 from above the platen 102. In the present embodiment, an opened state of the cover 103 particularly means a state in which light is allowed to enter the scanning area 205 from parts excluding light sources 105 and 1141, and a state in which a manuscript is allowed to be disposed on the platen 102. On the other hand, a closed state of the cover 103 means a state in which light is prevented from entering the scanning area 205 from parts excluding the light sources 105 and 1141, and a state in which a manuscript is not allowed to be disposed on the platen 102.

The color of the surface 131 of the cover 103 opposed to the platen 102 (i.e., back surface 131) is white. Therefore, the light reflectance of the back surface 131 is higher than that of a sheet of paper that has not been printed out. With the above described white back surface 131, as is hereinafter explained, the amount of reflected light in a position without manuscript will be greater than that in a position with a manuscript when the cover 103 is closed, and accordingly the amount of light received by the reflection sensor 114 and the CCD 112 will be increased.

The first carriage 104 includes a slit 107. The light source 105 is provided on the first carriage 104, and a first mirror 106 is provided in the interior of the first carriage 104. The light source 105, the first mirror 106, and the slit 107 are disposed so that light from the light source 105 is reflected by the cover 103 or a manuscript disposed on the platen 102, and then the reflected light passes through the slit 107, enters the interior of the first carriage 104, and is reflected by the first mirror 106.

A second mirror 109 and a third mirror 110 are disposed in the interior of the second carriage 108 so that the reflected light from the first mirror 106 is reflected by the second mirror 109 and then the reflected light from the second mirror 109 is reflected by the third mirror 110.

The group of lenses 111 and the CCD 112 are sequentially disposed in this order on the path of the light from the third mirror 110. In other words, the light from the third mirror 110 passes through the group of lenses 111 and is then received by the CCD 112.

The CCD 112 includes a plurality of light-receiving elements that are arranged in the main-scanning direction. Each of the light-receiving elements converts the received light into an electric signal depending on the intensity of the received light.

As illustrated in FIGS. 1 and 2, the reflection sensors 114A to 114D are disposed in the vicinity of the center part of the platen 102 in the main-scanning direction so as to be arranged in a line parallel to the sub-scanning direction. Note that arrangement of the reflection sensors may be changed as needed. For example, the reflection sensors do not have to be arranged in a line, and may be arranged to be separated away from the center part of the platen 102.

Figure 3:
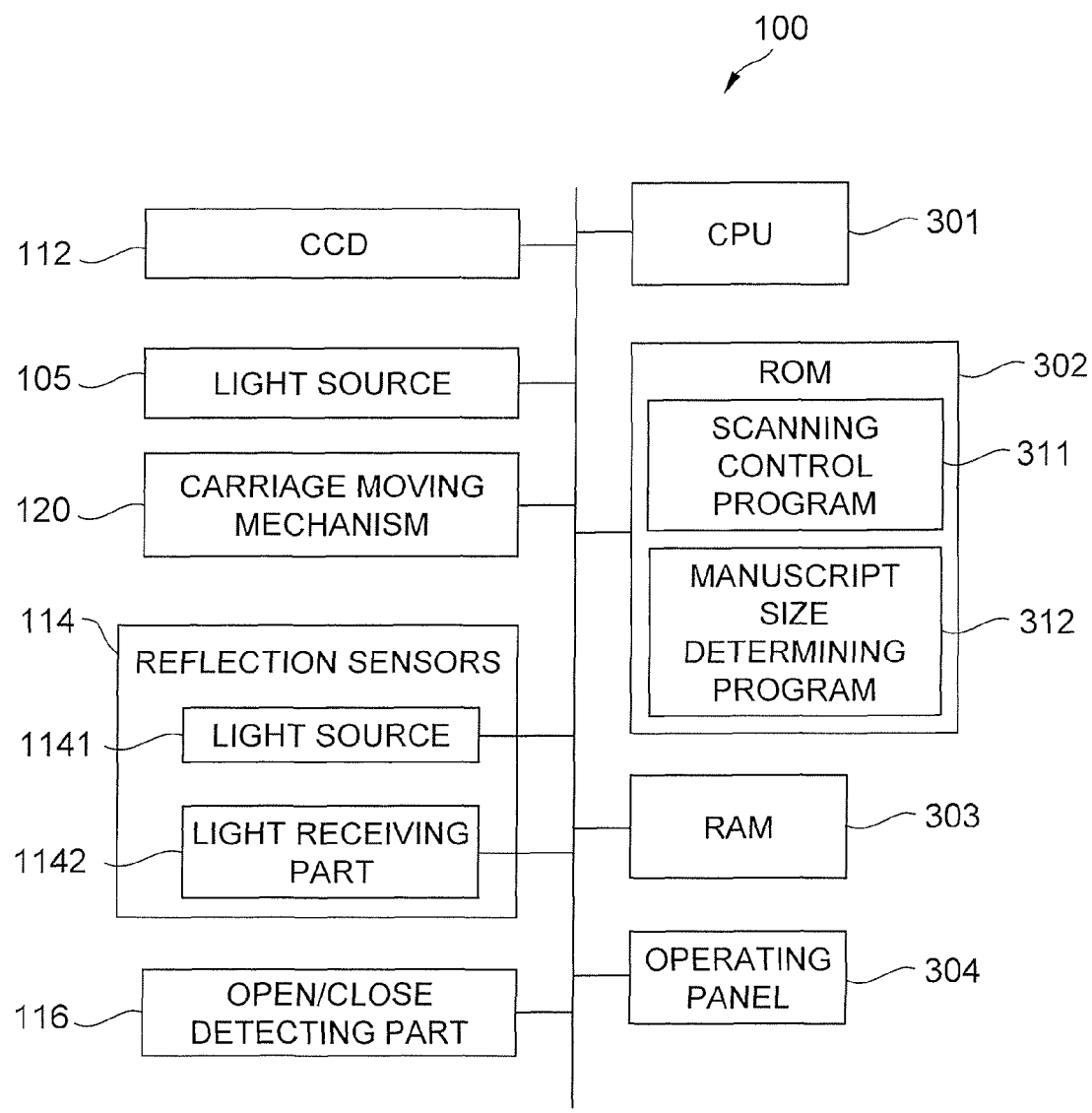
FIG. 3 is a view of a block diagram illustrating main elements of the image scanning device.

Referring to FIGS. 1 to 3, each of the reflection sensors 114A to 114D includes the light source 1141 and a light-receiving part 1142. The light source 1141 and the light-receiving part 1142 are disposed so that light from the light source 1141 is directed to the platen 102 and is reflected by the manuscript M or the cover 103 and then the reflected light enters the light-receiving part 1142.

The open/close detecting part 116 is disposed on the upper surface of the main body 101 so as to be opposed to the cover 103. The open/close detecting part 116 is a contact-type sensor, and is configured to output a signal (e.g., "1") for indicating the closed state of the cover 103 to a CPU 301 (to be described) when the open/close detecting part 116 is pressed by the cover 103, and is configured to output a signal (e.g., "0") for indicating the opened state of the cover 103 to the CPU 301 when the pressed condition is released.

As described in FIG. 3, the image scanning device 100 includes a carriage moving mechanism 120, the CPU (central processing unit) 301, a ROM (read only memory) 302, a RAM (random access memory) 303, an operating panel 304, and the like, in addition to the above described elements. Elements in the interior of the image scanning device 100 are connected through a bus.

The carriage moving mechanism 120 includes a driving device (e.g., motor), a rail, and the like. The carriage moving mechanism 120 is allowed to move the first and second carriages 104 and 108 in the sub-scanning direction under the control of the CPU 301 while arrangement of the first and second carriages 104 and 108 are maintained so that the reflected light to be originally generated from the light source 105 enters the CCD 112.

The CPU 301 controls elements in the interior of the image scanning device 100 and performs a variety of calculations by reading out and executing a program stored in a storage medium (e.g., ROM 302). The ROM 302 is allowed to store a variety of programs, and particularly stores a scanning control program 311 and a manuscript size determining program 312. The RAM 303 is used as a work area of the CPU 301.

The operating panel 304 includes a hard key, a touch panel, and the like. The operating panel 304 is configured to provide a user with a variety of screens and is configured to receive a user's instruction.

2. Determination of Manuscript Size

A manuscript size determining processing performed in the image scanning device 100 will be hereinafter explained.

(2-1) Summary of Manuscript Size Determining Processing

Figure 4:
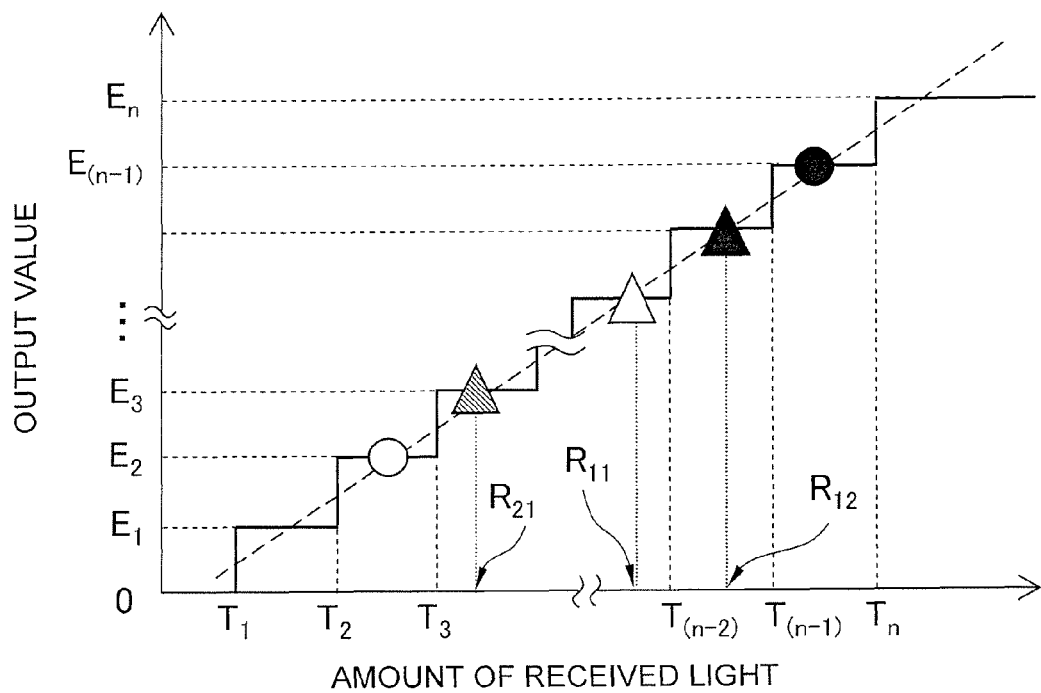
FIG. 4 is a view of a chart illustrating a relation between the amount of light received by a light sensor to be used in the image scanning device and the output value of the light sensor;
}
Figure 4:
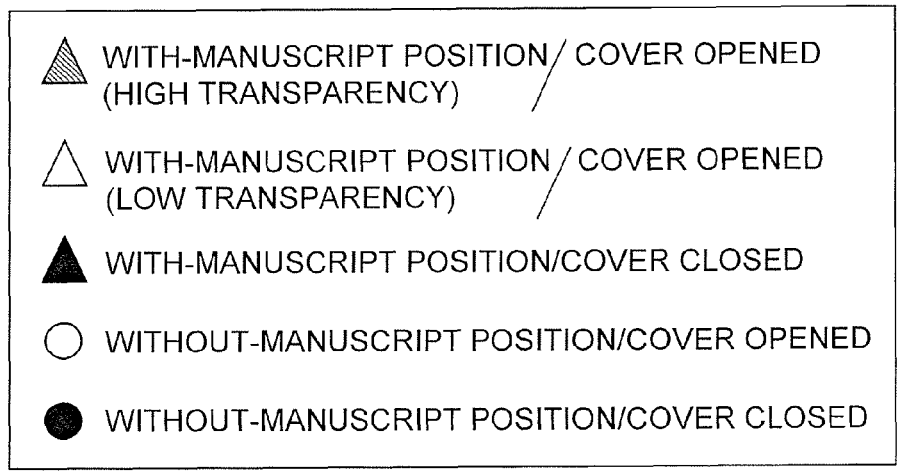
Figure 5:
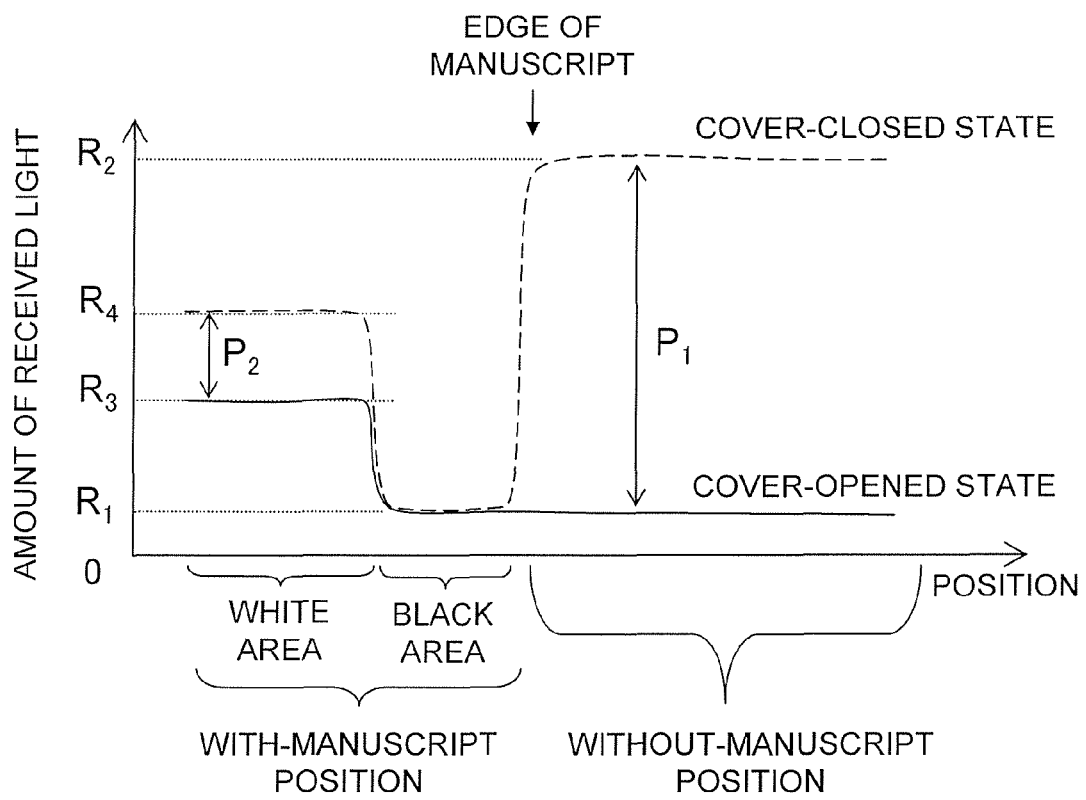
FIG. 5 is a view of a chart illustrating a relation between the position of the light sensor and the amount of light received by the light sensor.

The principle of the determination of the manuscript size in accordance with the present embodiment will be hereinafter explained with reference to FIGS. 4 and 5. FIG. 4 is a view of a chart illustrating a relation between the amount of light received by the light-receiving part and the output value of the light-receiving part. FIG. 5 is a view of a chart illustrating a relation between the position of the light-receiving part and the amount of light received by the light-receiving part. In FIG. 5, a solid line illustrates the amount of reflected light in the cover opened state (i.e., the state that the cover 103 is kept opened) and a dotted line illustrates the amount of reflected light in the cover closed state (i.e., the state that the cover 103 is kept closed).

Note that "the light receiving part" means a device that detects light and outputs an electric signal. In some cases, "the light receiving part" is referred to as a light sensor. The light receiving part 1142 and the light-receiving elements of the CCD 112 of the image scanning device 100 are examples of the light-receiving part.

As illustrated in FIG. 4, the light receiving part has n threshold values $T_1$ to $T_n$, and the output value is set to be: "0" if the amount of received light R falls in the range of $0 \leq R < T_1$; "$E_1$" if the amount of received light R falls in the range of $T_1 \leq R \leq T_2$; ... "$E_{(n-1)}$" if the amount of received light R falls in the range of $T_{(n-1)} \leq R \leq T_n$; and "$E_n$" if the amount of received light R falls in the range of $T_n \leq R$ (see the solid line in FIG. 4). In other words, the light receiving part is configured to classify magnitude of the amount of received light into "n+1" levels and is configured to output a signal depending on the level. With the configuration of the light receiving part, the output value of the light receiving part is configured to be increased as the amount of received light is increased, and is approximately proportionally increased with respect to the amount of received light as illustrated by the dotted line in FIG. 4.

The relation between the detection target position of the light receiving part and the amount of received light will be hereinafter explained. As illustrated by the solid line in FIG. 5, while the cover is in the opened state, only ambient light enters the light receiving part because there is no reflecting object, which returns light from below the platen 102, in the without-manuscript position (i.e., the position where the manuscript M does not exist) on the platen 102.

The amount of received light of the case is illustrated by $R_1$ in FIG. 5. On the other hand, as illustrated by the dotted line in FIG. 5, while the cover is in the closed state, the amount of received light $R_2$ of the light receiving part in the same position is greatly increased from the amount of received light $R_1$ in the cover-opened state, because light is reflected by the white back surface 131. Here, the range between the amount of received light $R_1$ and the amount of received light $R_2$ is set to be $P_1$.

On the other hand, in the with-manuscript position (i.e., the position where the manuscript M exists), regardless of whether the cover 103 is kept closed or opened, light from below the platen 102 is reflected by a white area (unprinted area) on the manuscript M. As a result, a range $P_2$ between the amount of received light $R_3$ of the light receiving part in the white area in the cover-opened state and the amount of received light $R_4$ of the light receiving part in the white area in the cover-closed state will be less than the range $P_1$ in the without-manuscript position.

As described above, the light receiving part converts the amount of received light into an electric signal and outputs it to the CPU 301. The CPU 301 is configured to calculate the range between an output value of the light receiving part in the cover-opened state and that in the cover-closed state. Thus, the CPU 301 can function as a range obtaining part. As described above, the output value of the light receiving part reflects the amount of received light. Therefore, the range between output values reflects difference between the amounts of received light. Also, the CPU 301 judges that a manuscript exists in a position where the calculated range is relatively small. In short, the CPU 301 is capable of judging that a boundary between the with-manuscript position and the without-manuscript position, that is, the edge of the manuscript exists between a position with relatively small range and a position with relatively large range. Thus, the CPU 301 is capable of determining the size of the manuscript M. Determination of the manuscript size will be hereinafter explained in detail with reference to the figures including FIG. 6.

The white area has been described above. Also, as described in FIG. 5, the range between output values in a black area (i.e., a printed area, particularly an area with high printing density on the manuscript M) in the with-manuscript position in the cover-opened and cover-closed states will be less than the range between the output values in the without-manuscript position. This is because light is absorbed in the black area of the manuscript regardless of whether the cover is being opened or closed, and accordingly the amount of reflected light will be reduced.

It is possible to detect the difference between the range between the amounts of received light in the with-manuscript position and the range between the amounts of received light in the without-manuscript position when the above described number "n" is equal to or greater than 2. In other words, the light receiving part may be configured to be capable of outputting signals with three or more levels depending on the amount of received light. In this case, the range between the output values is calculated as three of more kinds of values.

Also, two or more of the threshold values $T_1$ to $T_n$ are set between the amount of received light $R_1$ in the without-manuscript position in the cover-opened state and the amount of received light $R_2$ in the without-manuscript position in the cover-closed position. Accordingly, a clear difference will be produced between the output values of the light receiving part in the cover-opened and cover-closed states.

Also, a clear difference will be produced between the range between the output values in the with-manuscript and without-manuscript positions if at least one of the threshold values $T_1$ to $T_n$ is set between the amount of received light $R_3$ in the white area in the cover-opened state and the amount of received light $R_1$ in the without-manuscript position, or is set between the amount of received light $R_4$ in the white area in the cover-closed state and the amount of received light $R_2$ in the without-manuscript position. Two or more of the threshold values $T_1$ to $T_n$ preferably fall within the range.

Also, clear difference will be similarly produced in the range between output values even if an interval between any two of the threshold values $T_1$ to $T_n$ is set to be greater than the range $P_2$ between the amounts of received light. It is possible to apply preferably a range in the white area of a sheet of paper with a relatively high optical transparency in the frequently-used kinds of paper as the range $P_2$ of the case.

Note that the threshold values $T_1$ to $T_n$ are set in consideration of light reflectance of the back surface 131, optical transparency of a sheet of paper that is allowed to be used as a manuscript, and the like. For example, if the optical transparency of the back surface 131 is high, the amount of received light $R_2$ will be increased. Also, when a sheet of paper with high transparency is used as a reference, the amount of received light $R_3$ will be reduced. On the other hand, when a sheet of paper with low transparency is used as a reference, the amount of received light $R_3$ will be increased.

(2-2) Specific Example

Figure 6:
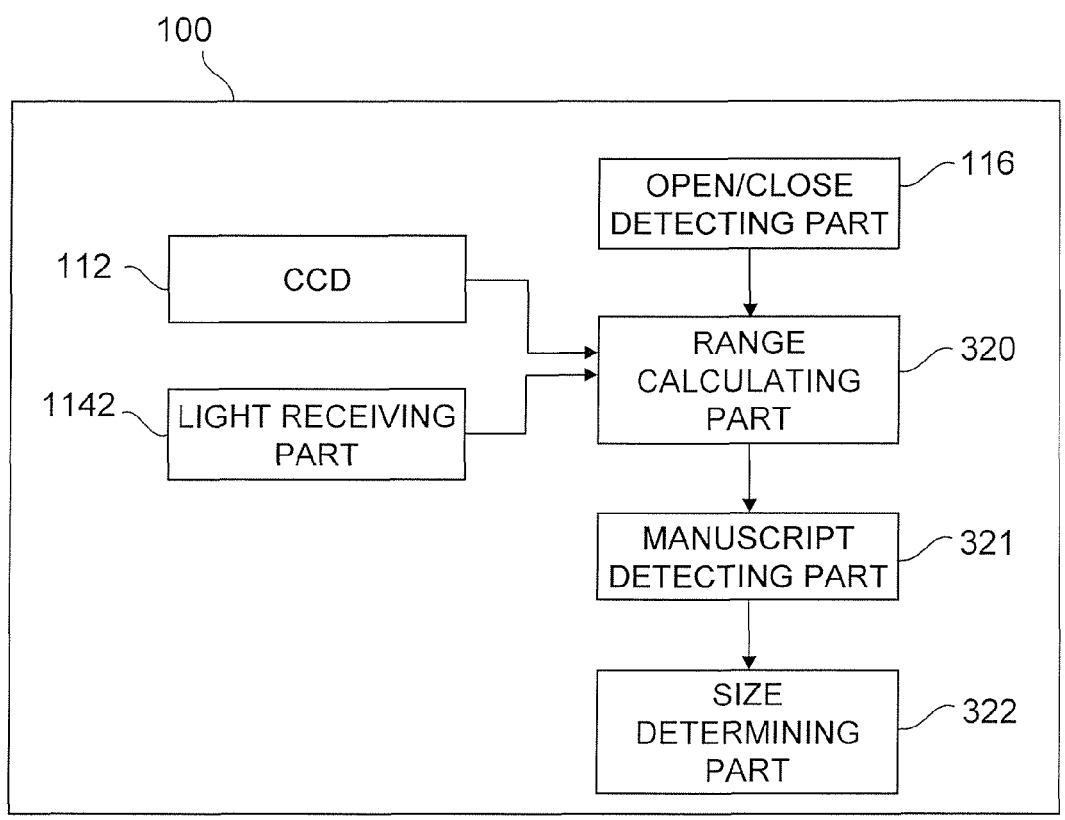
FIG. 6 is a view of a diagram illustrating the data flow within the image scanning device in the determination of the manuscript size.
Figure 7:
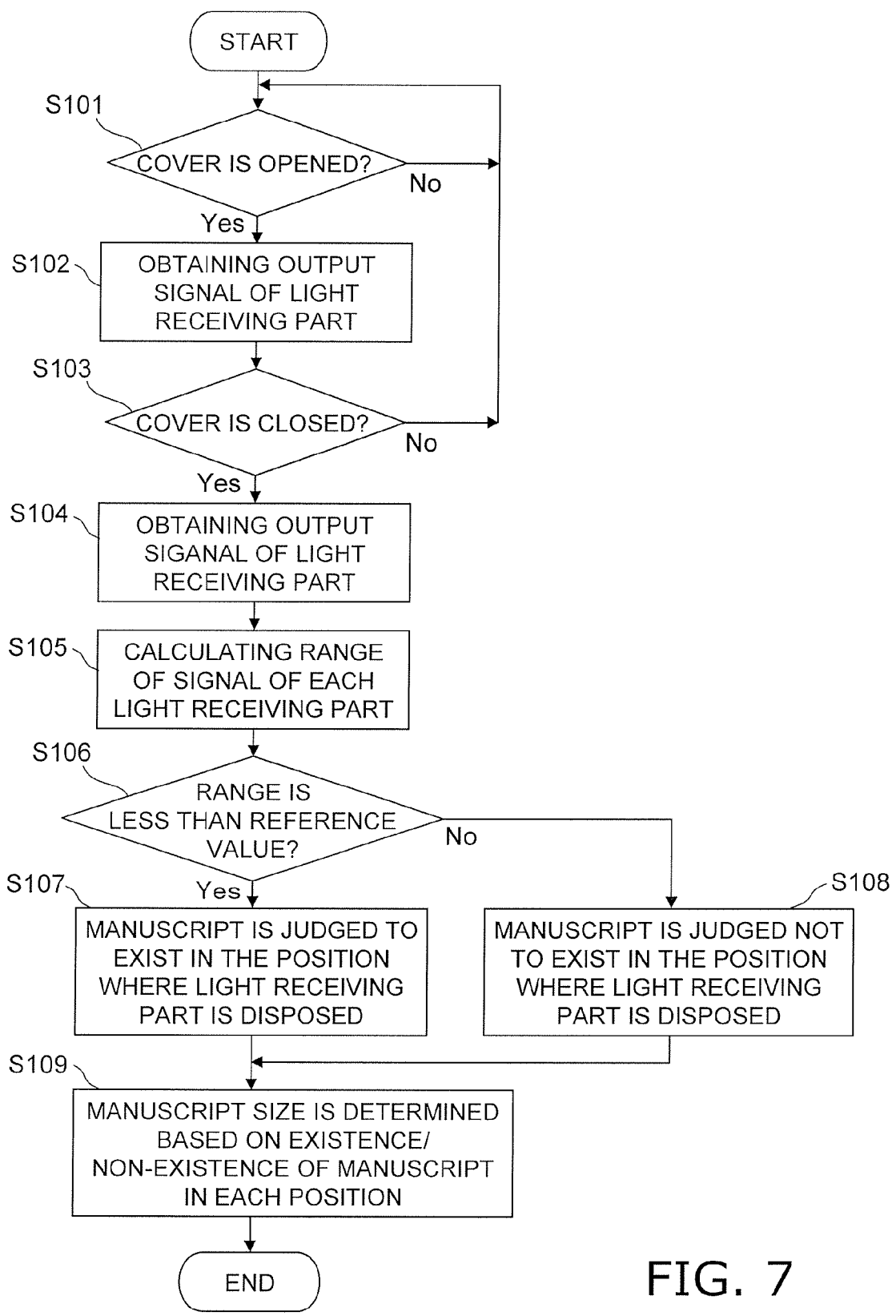
FIG. 7 is a view of a flowchart illustrating the flow of the determination of the manuscript size.
Figure 8:
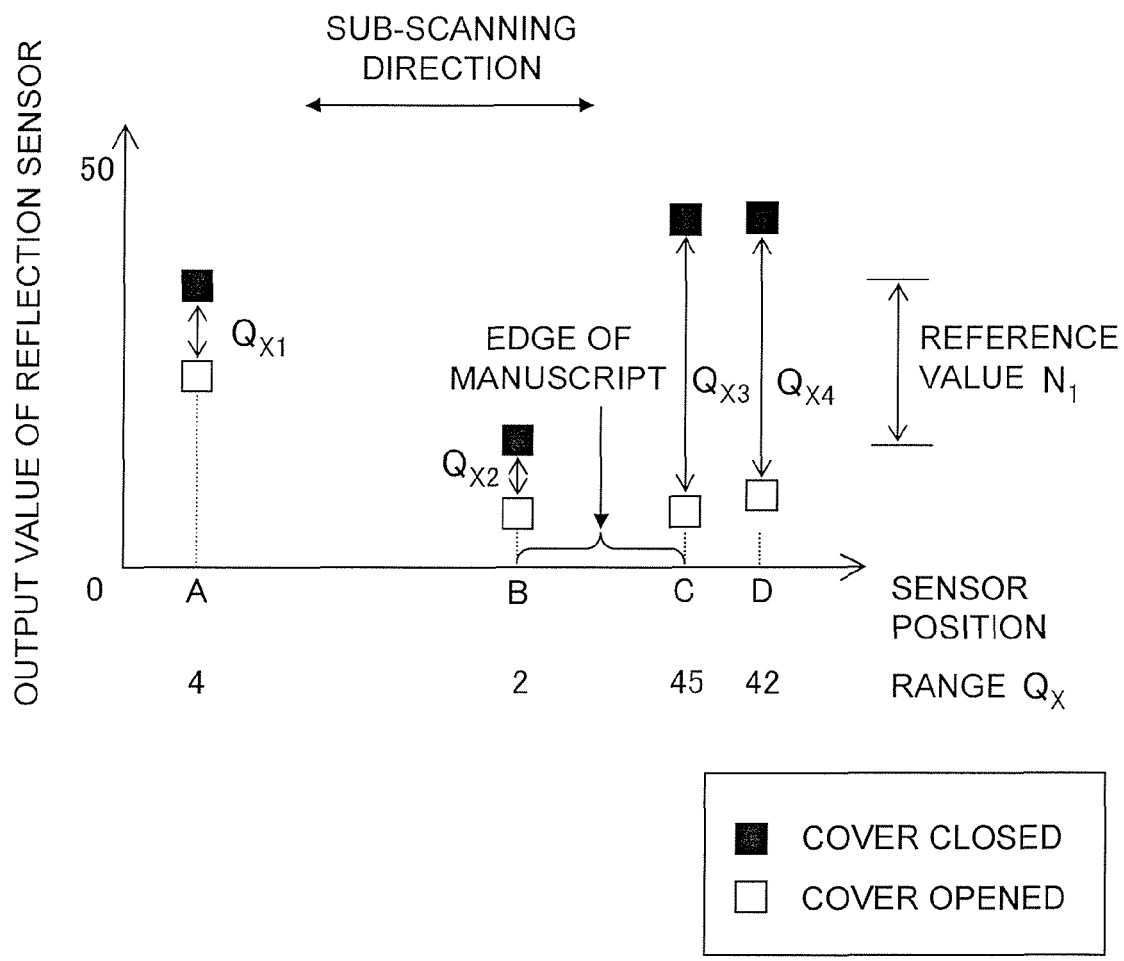
FIG. 8 is a view of a diagram illustrating an example of the output value of reflection sensors of the image scanning unit.
Figure 9:
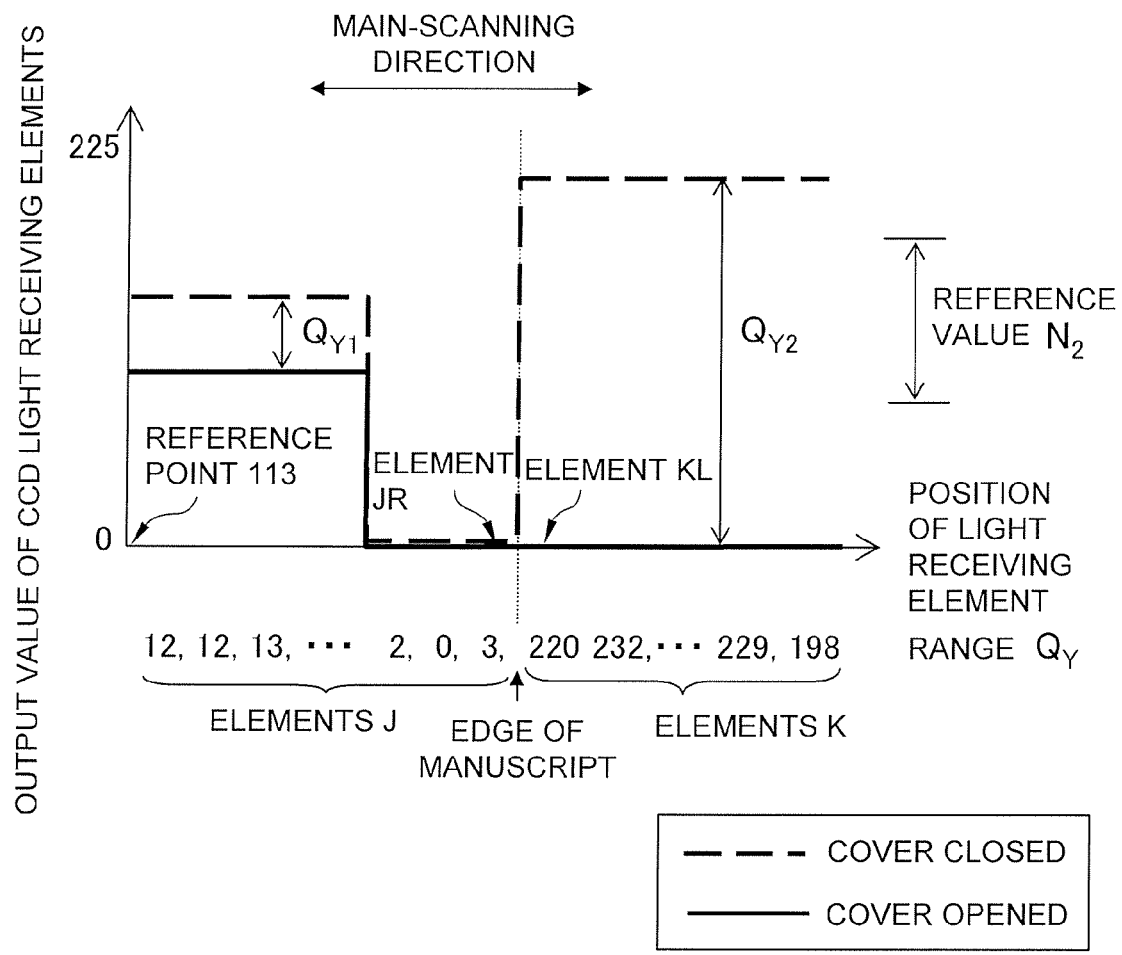
FIG. 9 is a view of a diagram illustrating an example of the output value of a charged-coupled device of the image scanning device.

A specific example of a determination of the manuscript size in the above described section (2-1) will be hereinafter explained with reference to FIGS. 6 to 9. In the example, the light receiving part 1142 of the reflection sensors 114 and the light-receiving element of the CCD 112 are used as examples of the light receiving part. FIG. 6 is a view of a diagram illustrating the data flow in the image scanning device 100. FIG. 7 is a view of a flowchart illustrating a series of processing flow. FIGS. 8 and 9 are views of charts illustrating an example of the output value from the reflection sensors 114 and the CCD 112.

As illustrated in FIG. 6, the image scanning device 100 specifically includes a range calculating part 320, a manuscript detecting part 321, and a size determining part 322 as a mechanism for detecting the manuscript size. The range calculating part 320, the manuscript detecting part 321, and the size determining part 322 are realized when the CPU 301 executes the manuscript size determining program 312 stored in the ROM 302.

Magnitude of the output signal from the light receiving part 1142 is configured to vary in the range between 0 and 5 V. In addition, the minimum unit of the signal of the light receiving part 1142 is set to be 0.1 V. In other words, in the light receiving part 1142, n is set to be 50 (n=50), and accordingly the light-receiving part 1142 is configured to classify the amount of received light into 51 levels and is configured to output a signal that corresponds to any of 51 levels (i.e., 0 to 50).

On the other hand, magnitudes of the output signals of light receiving elements in the CCD 112 is configured to fall in the range between 0 and 1.5 V. In the light receiving elements, n is set to be 225 (n=225). In other words, the CCD 112 is configured to classify the amount of received light into 226 levels and is configured to output a signal that corresponds to any of 226 levels (i.e., 0 to 225).

As seen in FIGS. 1 and 2, the reflection sensors 114 and the CCD 112 are respectively used for the determination of the manuscript size in the sub-scanning direction and for determination of the manuscript size in the main-scanning direction. Also, the size determinations in the main-scanning and sub-scanning directions are performed in approximately the same flow, but the light receiving parts to be used in the both size determinations are only different from each other. First, the size determination in the sub-scanning direction will be hereinafter explained.

Referring to FIGS. 1, 2, and 6-8, normally, the cover 103 is kept closed in a standby state in which scanning of a manuscript is not performed. When a user opens the cover 103 for the purpose of disposing a manuscript on the platen 102, the open/close detecting part 116 detects that the cover 103 is opened, and outputs a signal indicating the cover-opened state to the range calculating part 320. When the range calculating part receives the detection result, the range calculating part 320 reads output values from the four reflection sensors 114A to 114D (Yes in Step S101 of FIG. 7, then Step S102). Next, when the detection result of the open/close detecting part 116 indicates that the cover 103 is closed, the range calculating part 320 reads the output values from the reflection sensors 114A to 114D again (Yes in Step S103, then Step S104).

The range calculating part 320 calculates the range $Q_x$ ($Q_{x1}$ to $Q_{x4}$, FIG. 8) from the opened state to the closed state with respect to each of the output values of the reflection sensors 114A to 114D (Step S105).

The manuscript detecting part 321 determines if a manuscript exists or not based on thus obtained four ranges $Q_{x1}$ to $Q_{x4}$ (Steps S106 to S108). Specifically, the manuscript detecting part 321 performs the following processing.

The manuscript detecting part 321 has a reference value $N_1$. The reference value $N_1$ is set to be greater than the range between output values of the reflection sensors 114, which is obtained from the white area of a general manuscript, and is also set to be less than the range between output values in the without-manuscript position.

The manuscript detecting part 321 compares the ranges $Q_{x1}$ to $Q_{x4}$ with the reference value $N_1$ (Step S106). Then, the manuscript detecting part 321 judges that a manuscript exists in a position where the sensor 114 with the range less than the reference value $N_1$ is mounted (Yes in Step S106, then Step S107), and also judges that a manuscript does not exist in a position where the sensor 114 with the range equal to or more than the reference value $N_1$ is mounted (No in Step S106, then Step S108).

Thus, the manuscript detecting part 321 detects existence of the manuscript M in each of the positions, and the size determining part 322 determines the position of the edge of the manuscript in the sub-scanning direction, that is, the manuscript size in the sub-scanning direction, based on the detection result by the manuscript detecting part 321 (Step S109).

Determination of the manuscript size in the sub-scanning direction will be hereinafter further specifically explained with reference to FIGS. 1, 2, 6, and 8. In FIG. 8, symbols A to D respectively indicate the positions of the reflection sensors 114A to 114D. Also, a rectangle indicates the output value of each of the sensors 114A to 114D. Here, a black rectangle indicates the output value in the cover-closed state and a white rectangle indicates the output value in the cover-opened state.

In the present example, the ranges $Q_{x1}$ and $Q_{x2}$ in the positions A and B are respectively less than the reference value $N_1$. Also, the ranges $Q_{x3}$ and $Q_{x4}$ in the positions C and D are equal to or greater than the reference value $N_1$, respectively Accordingly, the manuscript detecting part 321 determines that a manuscript exists in the positions A and B, and also determines that a manuscript does not exist in the positions C and D. Based on the determination result, the size determining part 322 determines that the edge of the manuscript exists between the positions B and C.

Note that in the present example, the output value of the sensors 114 falls in the range between 0 and 50, and accordingly the ranges $Q_{x1}$ and $Q_{x2}$ in the with-manuscript position fall in the range between 0 and 5. On the other hand, the ranges $Q_{x3}$ and $Q_{x4}$ in the without-manuscript position is set to be a value close to 50. Therefore, the reference value $N_1$ may be set to be approximately 10 to 20.

As described in the above section (2-1), even within the with-manuscript position, the output values of the reflection sensor 114 themselves in the white and black areas are different from each other. Also, even within the without-manuscript area, the output value is influenced by ambient light and the like, and accordingly the output values themselves may be different from each other in different positions. Even in the example of FIG. 8, the output values of the reflection sensor 114 in the positions A and B are different from each other, and those in the positions C and D are also different from each other. However, a clear difference is produced in the ranges $Q_{x1}$ to $Q_{x4}$ in the with-manuscript and without-manuscript positions. Therefore, the manuscript detecting part 321 is capable of accurately detecting the existence of a manuscript.

Next, determination of the manuscript size in the main-scanning direction will be explained. An operation illustrated in the flow of FIG. 7 is also performed in the determination of the manuscript size in the main-scanning direction. In other words, a processing similar to the above described determination of the manuscript size in the sub-scanning direction will be performed for the determination of the manuscript size in the main-scanning direction, and the determination of the manuscript size in the main-scanning direction is only different from that in the sub-scanning direction in that the range calculating part 320 calculates the range based on the output value from the CCD 112 not based on the output value from the reflection sensors 114.

In other words, the range calculating part 320 calculates the range $Q_Y$ between output values of each of the light receiving elements in the CCD 112 from the cover-opened state to the cover-closed state (Steps S101 to S105). The manuscript detecting part 321 has a second reference value $N_2$, and detects the existence of a manuscript based on whether or not the range of each of the light receiving elements is equal to or greater than the reference value $N_2$ (Steps S106 to S108). The size determining part 322 determines the manuscript size based on the detection result by the manuscript detecting part 321 (Step S109). Note that the reference value $N_2$ is set to be greater than the range between output values of the light receiving element, which is obtained with respect to the white area of a general manuscript when the cover is opened and closes, and is set to be less than the range in the without-manuscript position. Also, the range $Q_Y$ is calculated as the absolute value in a similar way to the range $Q_X$ in the sub-scanning direction.

In the manuscript size determining processing, while obtaining the output value from the CCD 112 (Steps S102 and S104), the CPU 301 instructs the carriage moving mechanism 120 to dispose the first carriage 104 and the second carriage 108 in positions where the CCD 112 is allowed to detect the reflected light from a line including the reference point 113, and thereby the carriage moving mechanism 120 does the same. Detection of the reflected light from the vicinity of the reference point 113 by the CCD 112 makes it possible to determine the size of a variety of manuscripts from a manuscript with a small size to a manuscript with a large size.

Determination of the manuscript size in the main-scanning direction will be hereinafter further specifically explained with reference to FIG. 9. The number of the light receiving elements provided in the CCD 112 is much greater than that of the reflection sensors 114. Accordingly, in FIG. 9, the output value of each of the light receiving elements is not illustrated with a dot for each sensor as seen in FIG. 8, but is illustrated with a line connecting the output values of the light receiving elements. In FIG. 9, the solid line illustrates the output value in the cover-closed state and the dotted line illustrates the output value in the cover-opened state.

The output value of each of the light receiving elements in the CCD 112 falls in the range between 0 and 225. Therefore, it is predicted that the range in the with-manuscript position will be approximately 0 to 20 and the range in the without-manuscript position will be approximately 200. In response to this, the reference value $N_2$ in the present example is set to be 40 to 100.

As illustrated in FIG. 9, in the present example, the range $Q_Y$ between the output values of elements (illustrated as "elements J" in FIG. 9) from the reference point 113 to a light receiving element JR falls in the range between 0 to 15 (all together illustrated as the value $Q_{Y1}$). Then, the range $Q_Y$ between output values (all together illustrated as range $Q_{Y2}$) of an element such as an element KL, which is more separately positioned from the reference point 113 than the light receiving element JR (illustrated as "elements K" in FIG. 9), is configured to be around 200. In other words, when the reference value $N_2$ is compared with the range of each of the elements, the range $Q_{Y1}$ of the elements J is less than the reference value $N_2$, and the range $Q_{Y2}$ of the elements K is greater than the reference value $N_2$.

The manuscript detecting part 321 is capable of determining that a manuscript exists on the positions of the elements J and that a manuscript does not exist on the positions of the elements K based on the above described comparison result. In response to the determination result, the size determining part 322 is capable of determining that the edge of the manuscript exists between the element JR and the element KL, that is, that the width of the manuscript in the main-scanning direction corresponds to the length from the reference point 113 to the element JR.

As described above, the size determining part 322 is capable of determining the lengths of the manuscript M in the sub-scanning and main-scanning directions, that is, the size of the manuscript M.

3. Image Scanning

Referring to FIGS. 1, 2, and 3, when the CPU 301 receives a user's instruction of performing image scanning through the operating panel 304, the CPU 301 executes image scanning while executing a manuscript size determining processing. In other words, when a user opens the cover 103 and sets the manuscript M on the platen 102 and then closes the cover 103, the manuscript size is obtained by the above described processing explained in the section entitled "2. Determination of Manuscript Size," and then image scanning will be performed as described below. The image scanning will be realized when the CPU 301 executes the scanning control program 311.

When the open/close detecting part 116 detects that the cover 103 is closed, the carriage moving mechanism 120 moves the first carriage 104 downward along the scanning line including the reference point 113 under the control of the CPU 301.

Light from the light source 105 is reflected by the manuscript M, and the reflected light is converted into an electric signal by the CCD 112. Thus an image corresponding to a line of the manuscript M in the main-scanning direction is digitized.

The CPU 301 is capable of performing scanning in the sub-scanning direction by converting the reflected light into an electric signal in the CCD 112 while moving the first carriage 104 and the second carriage 108 in the sub-scanning direction by way of the carriage moving mechanism 120. Thus, the image scanning device 100 is capable of obtaining an image of the entire manuscript M disposed within the scanning area 205 as the digitized image information.

4. Application to Photocopier

The image information obtained by the image scanning device 100 is stored in a memory device (not illustrated in the figure), and is transmitted to other machines, processing units, or the like when needed. Other machines include a facsimile device, a printing device, and the like. In short, the image scanning device is capable of being applied to a photocopier, a facsimile device, a scanner, or a multifunction peripheral (MFP) including these devices.

A photocopier in which the image scanning device 100 is embedded will be hereinafter exemplified. The photocopier includes an image forming device in addition to the image scanning device 100. The image forming device mainly includes a printing device for printing an image on a sheet of paper, a paper containing part for containing a plurality of kinds of paper, and a paper transporting part for selecting a kind of paper contained in the paper containing part and transporting a sheet of selected kind of paper to the printing device.

In the photocopier, the paper transporting part selects a kind of paper that fits the manuscript size based on the manuscript size information obtained by the manuscript size determining processing. Then, the printing device prints an image on the sheet of paper based on the image information obtained by the image scanning device 100. Thus, the photocopier is capable of providing a user with a copied product of the manuscript.

5. Modified Examples

It is possible to modify the image scanning device 100 as follows.

(a) The image scanning device 100 may be configured to detect the manuscript size in the both main-scanning and sub-scanning directions based on the output value of the CCD 112. In this case, the CPU 301 instructs the carriage moving mechanism 120 to move the first carriage 104 and the second carriage 108 in the sub-scanning direction in both the closed and opened states of the cover 103, and the carriage moving mechanism 120 accordingly does the same. Then, the range calculating part 320 calculates the range between the output values of each of the elements in the CCD 112 not only in the main-scanning direction but also in the sub-scanning direction. Then, the size determining part 322 may determine the manuscript size based on the range.

Figure 10:
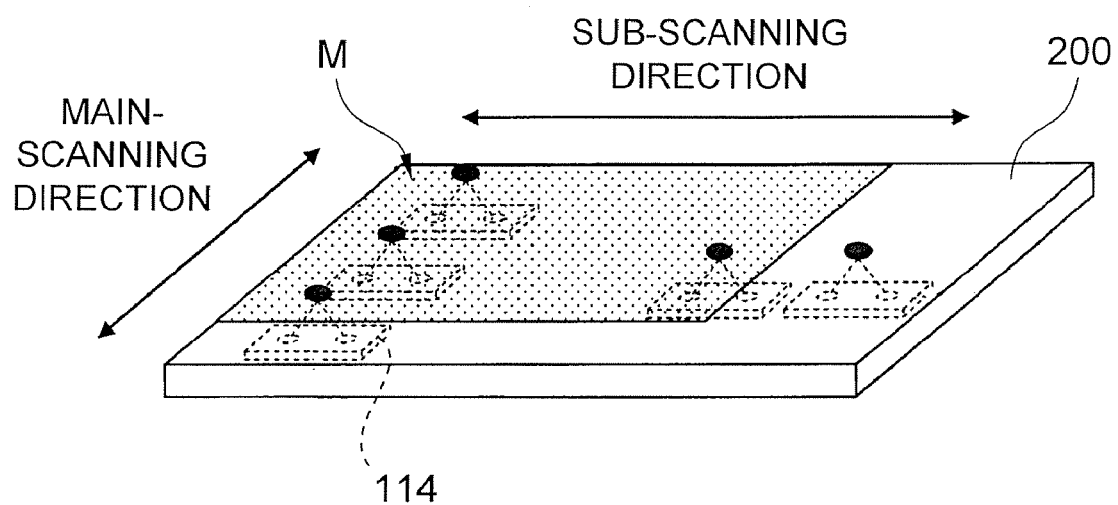
FIG. 10 is a perspective view illustrating the arrangement of reflection sensors in a modified example of the preferred embodiment.

(b) As illustrated in FIG. 10, with a configuration in which a plurality of reflection sensors 114 is arranged in the image scanning device 100 not only in the sub-scanning direction but also in the main-scanning direction, it is possible to determine the manuscript size in the both main-scanning and sub-scanning directions based on the output value of the reflection sensors 114.

(c) It is also possible to change the configuration of the image scanning device 100 so that the image scanning device 100 does not include the size determining part 322. In this case, it is possible to configure the scanning control program 311 so that image scanning is performed when the manuscript detecting part 321 detects existence of a manuscript.

6. Comparative Example

A comparative example will be hereinafter described with reference to FIGS. 11 to 14. The above described embodiment will be further explained in detail by the comparison with the comparative example.

Basically an image scanning device of the comparative example includes the same members that are provided in the above described image scanning device 100, but configurations of a reflection sensor or sensors 114 and a manuscript size determining program 312 in the comparative example are different from those in the above described embodiment. Therefore, explanation of the above-described members will be hereinafter omitted.

Figure 11:
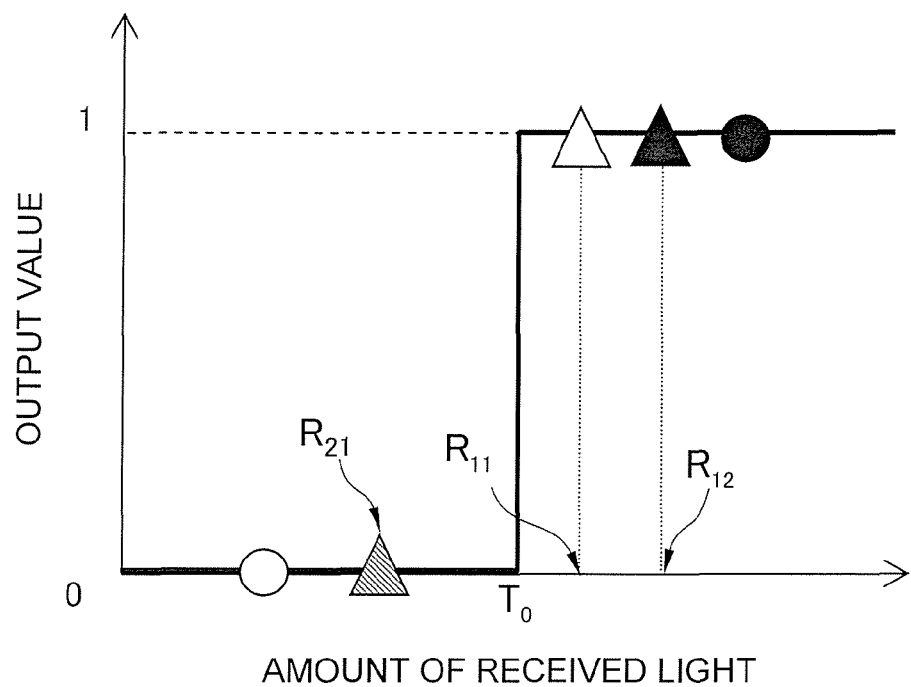
FIG. 11 is a view of a chart illustrating a relation between the amount of light received by a reflection sensor in accordance with a comparative example and the output value of the reflection sensor.
Figure 12:
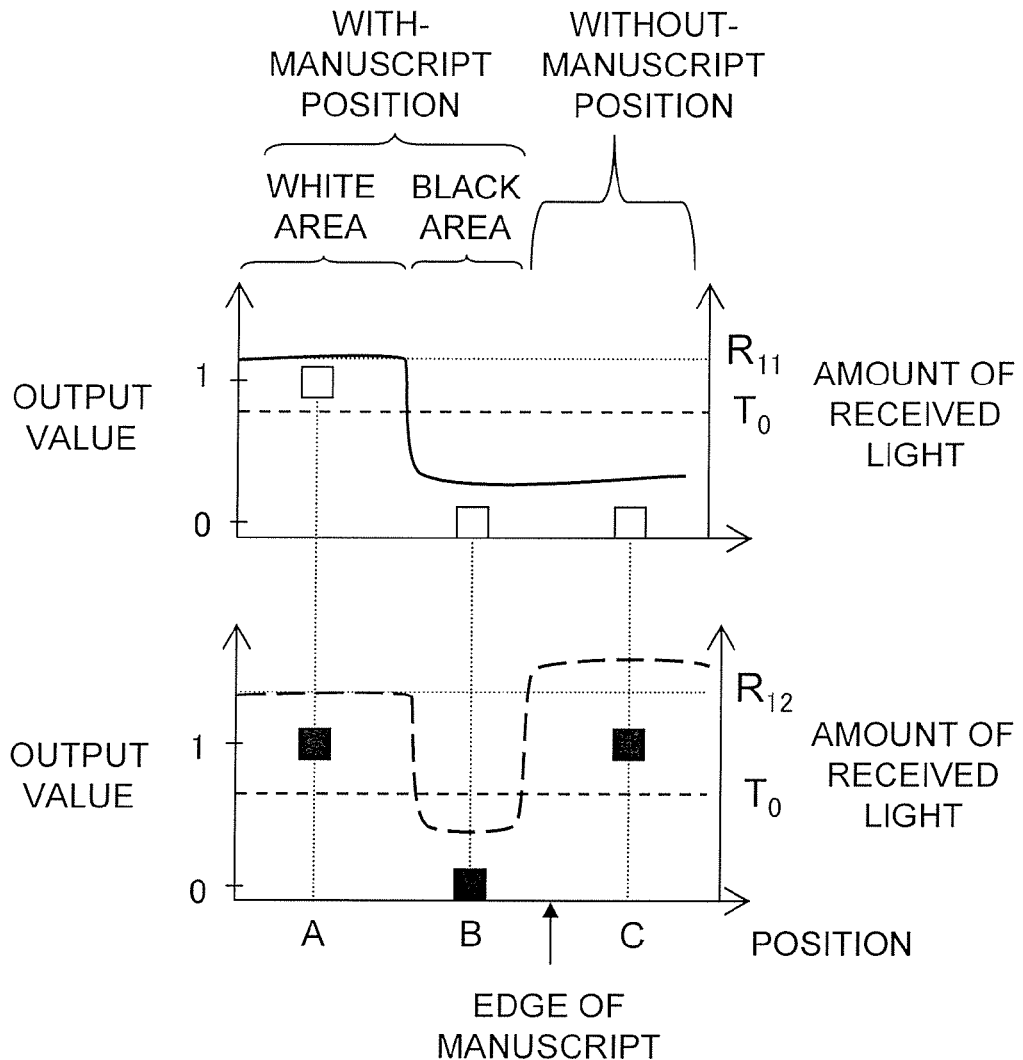
FIG. 12 is a view of charts illustrating the amount of light received by the reflection sensors in accordance with the comparative example and the output value of the reflection sensors in a cover-opened state (see upper chart) and a cover-closed state (see lower chart) when a manuscript made of a sheet of paper with low optical transparency is used.
Figure 12:
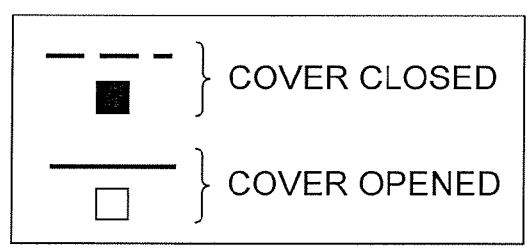
Figure 13:
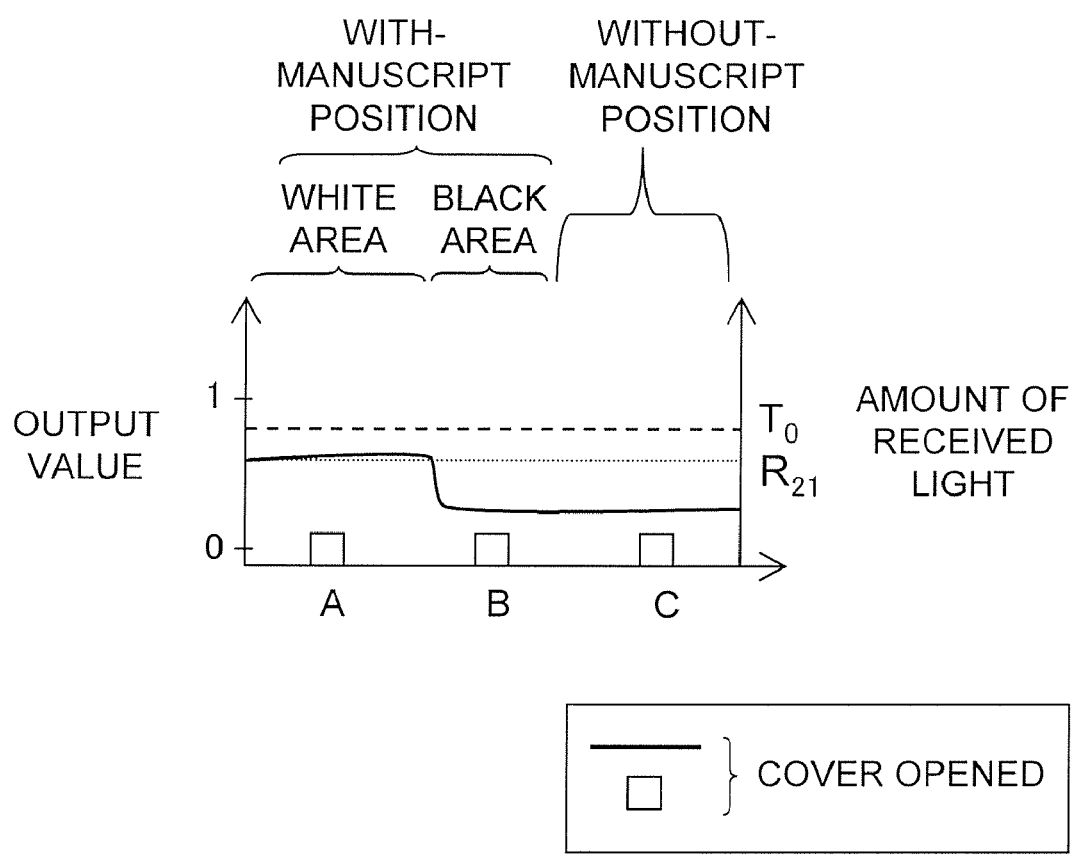
FIG. 13 is a view of a chart illustrating the amount of light received by the reflection sensors in accordance with the comparative example and the output value of the reflection sensors in the cover-opened state when a manuscript made of a sheet of paper with high optical transparency is used.
Figure 14:
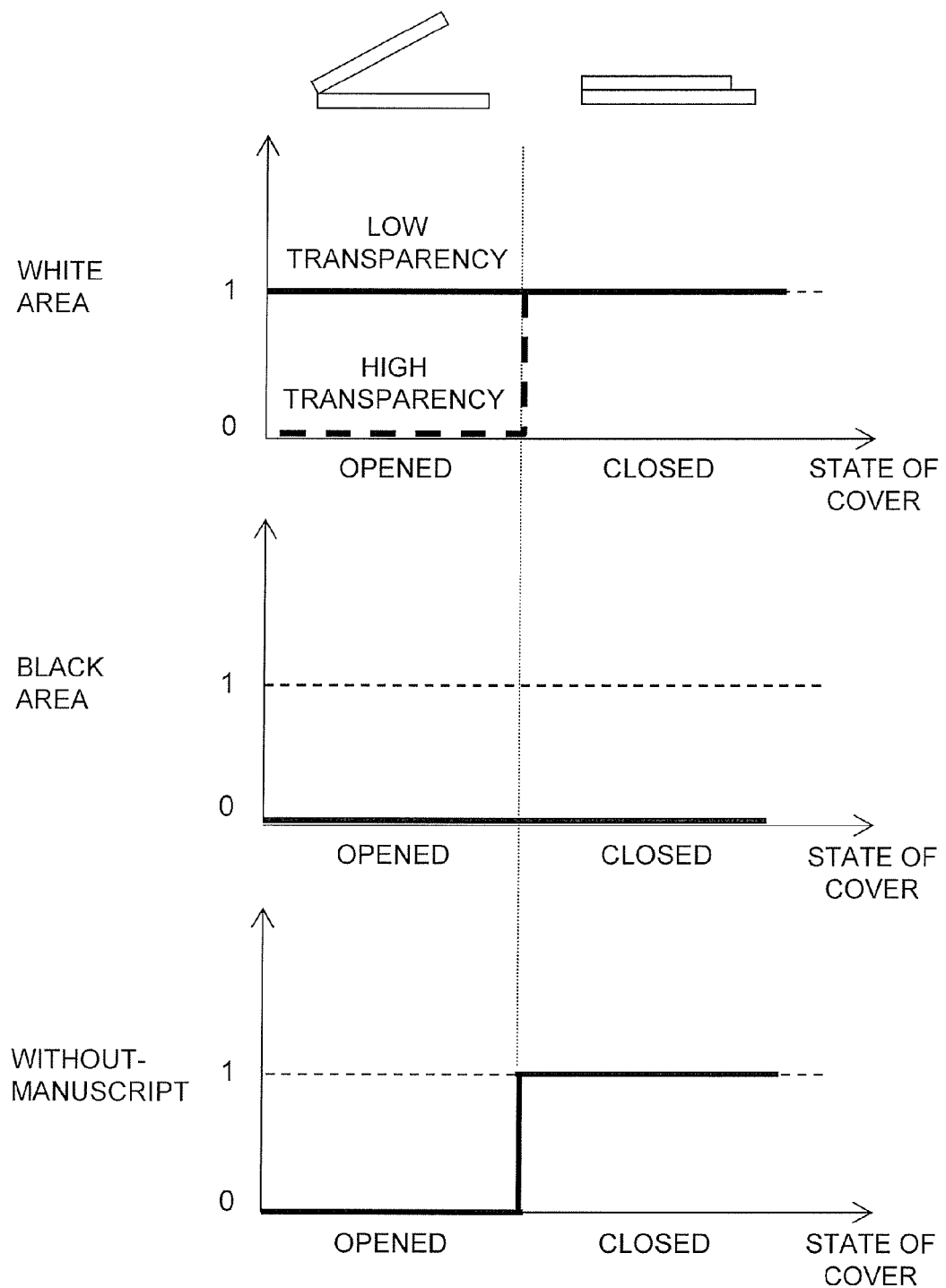
FIG. 14 is a view of a chart illustrating change in the output value of the sensors, which is caused when a flatten cover is opened or closed, in the examples of FIGS. 12 and 13 while a solid line corresponds to FIG. 12 and a dotted line corresponds to FIG. 13.

FIG. 11 is a view of a chart illustrating relation between the amount of received light and the output value in a reflection sensor in accordance with the comparative example. FIG. 12 is a view of a chart illustrating the amount of received light and the output value of the sensor with respect to a manuscript that is made up of a sheet of paper with low optical transparency. In FIG. 12, the upper chart illustrates an opened state of a platen cover, and the lower chart illustrates a closed state of the platen cover. FIG. 13 is a view of a chart illustrating the amount of received light and the output value of the reflection sensor with respect to a manuscript that is made up of a sheet of paper with high optical transparency. The difference in the optical transparency of manuscripts does not produce a big difference in the amount of received light and the output value in the cover-closed state. Therefore, FIG. 13 only illustrates a chart for the cover-opened state and a chart in the cover-closed state will be hereinafter omitted. Also, FIG. 14 is a view of a chart illustrating change in the output values of a sensor when the platen cover is opened and closed in the examples of FIGS. 12 and 13. In FIG. 14, the solid line corresponds to FIG. 12, and the dotted line corresponds to FIG. 13.

As illustrated in FIG. 11, the sensor has only one threshold value $T_0$, and is configured to output "0" if the amount of received light R falls in the range of $0 \leqq R < T_0$, and output "1" if the amount of received light R falls in the range of $T_0 \leqq R$. In other words, the reflection sensor has only two kinds of output signals "0" and "1."

In FIGS. 12 and 13, the reflection sensors of the comparative example are arranged in the positions A to C, which are similar to the positions of the reflection sensors 114A to 114C illustrated in FIG. 1. The position A and the position B are included in the white area and the black area in the with-manuscript position, respectively, and the position C is included in the without-manuscript position.

In the example illustrated in FIG. 12, the amount of received light $R_{11}$ in the position A exceeds the threshold To in the cover opened state. In addition, the amount of received light $R_{12}$ in the position A also exceeds the threshold $T_0$ in the cover closed state. Therefore, regardless of whether the cover is opened or closed, the output value of the sensor in the position A will be "1." Also, regardless of whether the cover is opened or closed, the amount of received light in the position B is less than the threshold value $T_0$, and accordingly the output value of the sensor in the position B will be "0." In other words, as illustrated in the above two charts in FIG. 14, with respect to a manuscript with low optical transparency, the output value of the sensor in the with-manuscript position is not changed regardless of the white area or the black area.

On the other hand, in the cover-opened state, the amount of received light in the position C will be less than the threshold value $T_0$. Also, in the cover-closed state, the amount of received light in the position C exceeds the threshold value $T_0$. Therefore, as illustrated in the bottom chart in FIG. 14, the output value of the sensor in the position C will be changed from "0" to "1" by opening and closing the platen cover.

In the present comparative example, based on the output value of the sensor, it is judged that a manuscript exists in the positions A and B where the output value is constant (i.e., "0" or "1") regardless of opening/closing of the platen cover, and that a manuscript does not exist in the position C where the output value is changed from "0" to "1." In other words, it is judged that the edge of the manuscript exists between the position B and the position C.

However, as illustrated in FIG. 13, when a manuscript with high optical transparency is disposed, the output value $R_{21}$ in the white area may be lower than the threshold value $T_0$ in the cover-opened state. Even in this case, the amount of received light in the white area in the cover-closed state will be close to the amount of received light $R_{12}$ in FIG. 12. Therefore, the output value of the sensor in the position A will be "1." In other words, even though a manuscript exists, the output value of the sensor in the position A will be changed from "0" to "1" by opening/closing the platen cover. As illustrated with the dotted line in FIG. 14, the aspect of the change is the same as that of the output value in the position C included in the without-manuscript position. It is impossible to accurately detect the edge of the manuscript based on the output value like this. Note that even if a CCD is used, a similar problem will be caused when the manuscript size is determined only based on two kinds of output values "0" and "1" of the CCD.

The above described embodiment and the present comparative example will be compared by putting the amounts of received light $R_{11}$, $R_{12}$, and $R_{21}$ in FIGS. 4 and 11.

As illustrated in FIG. 11, when a manuscript with high optical transparency is used, the amount of received light is changed from $R_{21}$ to $R_{12}$ across the only threshold value $T_0$ in the comparative example by closing/opening the platen cover. Accordingly, in the comparative example, the range between the output values by closing/opening the platen cover in the with-manuscript position will be the same as that in the without-manuscript position.

On the other hand, as illustrated in FIG. 4, the light receiving part of the embodiment has a plurality of threshold values. Therefore, even when a manuscript with high optical transparency is used, the range between the output values of the light receiving part by opening and closing the platen cover in the with-manuscript position will be different from that in the without-manuscript position. Therefore, according to the configuration of the embodiment, it is possible to determine the size of a plurality of kinds of paper with different optical transparencies.

GENERAL INTERPRETATION

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applied to words having similar meanings such as the terms, "including," "having," and their derivatives. Also, the term "part," "section," "portion," "member," or "element" when used in the singular can have the dual meaning of a single part or a plurality of parts. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An image scanning device, comprising:
   a platen having a manuscript scanning area, a front side, and a back side, the platen being configured to have a manuscript disposed on the front side thereof;
   an image scanning part being configured to scan an image on the manuscript disposed on the manuscript scanning area from the back side of the platen;
   a light source being configured to irradiate light to the manuscript scanning area from the back side of the platen;
   a platen cover being allowed to be positioned in a closed state or in an opened state, the closed state preventing light from entering the manuscript scanning area from the front side of the platen, the opened state allowing light to enter the manuscript scanning area from the front side of the platen;
   a light receiving part being configured to receive light from the manuscript scanning area on the back side of the platen; the light receiving part is configured to classify a magnitude of the amount of received light into three or more levels;
   a range obtaining part being configured to obtain a range between an amount of received light of the light receiving part in the opened state of the platen cover and an amount of received light of the light receiving part in the closed state of the platen cover, wherein the range obtaining part is configured to obtain a difference among the levels as the range;
   a manuscript detecting part being configured to detect existence of a manuscript in the manuscript scanning area based on the range.

2. The image scanning device of claim 1, wherein two or more boundaries among the levels are set between the amount of received light in the opened state of the platen cover and the amount of received light in the closed state of the platen cover when a manuscript does not exist.

3. The image scanning device of claim 1, wherein at least one boundary among the levels is set between an amount of received light when a manuscript does not exist and an amount of received light when a manuscript exists in the opened state of the platen cover.

4. The image scanning device of claim 1, wherein two or more boundaries are set, wherein the difference between any two of the boundaries among the levels is set to be greater than the difference between the amount of received light in the opened state of the platen cover and the amount of received light in the closed state of the platen cover when a manuscript exists.

5. The image scanning device of claim 1, wherein the manuscript detecting part is configured to detect the existence of a manuscript based on a comparison result between the range and a predetermined reference value.

6. The image scanning device of claim 5, wherein the manuscript detecting part is configured to judge that a manuscript does not exist if the range is equal to or more than the reference value and is configured to judge that a manuscript exists if the range is less than the reference value.

7. The image scanning device of claim 1, wherein the color of the surface of the platen cover opposed to the manuscript scanning area is white.

8. The image scanning device of claim 1, further comprising
   a size determining part, the size determining part being configured to determine the manuscript size, and
   wherein the light receiving part is configured to receive separately light from two or more positions within the manuscript scanning area,
   the range obtaining part is configured to obtain the range in each position,
   the manuscript detecting part is configured to detect existence of a manuscript in each position based on the range, and
   the size determining part is configured to determine the manuscript size based on the detection result of the manuscript detecting part with respect to each position.

9. The image scanning device of claim 1, wherein the light source and the light receiving part make up a reflection sensor.

10. The image scanning device of claim 1, wherein the light receiving part includes light-receiving elements of a CCD.

* * * * *